United States Patent [19]

Winiasz

[11] 4,228,698
[45] Oct. 21, 1980

[54] SPEED REDUCER

[76] Inventor: Michael E. Winiasz, 4009 Washington Ave., Lorain, Ohio 44052

[21] Appl. No.: 903,856

[22] Filed: May 8, 1978

[51] Int. Cl.³ ............................................. F16H 1/28
[52] U.S. Cl. ..................................................... 74/805
[58] Field of Search ................................. 74/804, 805

[56] References Cited

U.S. PATENT DOCUMENTS

| | | | |
|---|---|---|---|
| 474,903 | 5/1892 | Cottrell | 74/805 |
| 1,274,341 | 7/1918 | Slaught | 74/390 |
| 1,533,763 | 4/1925 | Schimek | 74/570 |
| 1,590,166 | 6/1926 | Howard | 74/804 |
| 1,658,767 | 2/1928 | Hall | 74/805 |
| 1,761,611 | 6/1930 | Burdett | 74/805 |
| 1,942,795 | 1/1934 | Benson | 74/805 |
| 2,170,951 | 8/1939 | Perry | 74/804 |
| 2,666,345 | 1/1954 | Amberg | 74/804 |
| 2,972,910 | 2/1961 | Menge | 74/804 |
| 3,037,400 | 6/1962 | Sundt | 74/804 |
| 3,144,791 | 8/1964 | Menge | 74/805 |
| 3,160,032 | 12/1964 | Black | 74/804 |
| 3,307,434 | 3/1967 | Kope | 74/804 |
| 3,320,828 | 5/1967 | Grant | 74/675 |
| 3,424,036 | 1/1969 | Colgan | 74/805 |
| 3,546,972 | 12/1970 | Morozumi | 74/804 |
| 3,894,507 | 7/1975 | Koechlin | 74/804 |
| 4,023,440 | 5/1977 | Kennington et al. | 74/804 |

FOREIGN PATENT DOCUMENTS

| | | | |
|---|---|---|---|
| 2424042 | 1/1975 | Fed. Rep. of Germany | 74/805 |
| 579067 | 7/1924 | France | 74/805 |
| 956383 | 4/1964 | United Kingdom | 74/805 |

Primary Examiner—Kenneth Dorner
Attorney, Agent, or Firm—Pearne, Gordon, Sessions

[57] ABSTRACT

A speed reducer is disclosed for providing large reductions in shaft speed in an efficient manner. The speed reducer is adapted to be mounted on the end of a source of input power, such as a motor or other prime mover, and comprises a gearing arrangement in a housing. A rotatable input shaft extends into the housing at one end from the motor, and a coaxial rotatable output shaft extends from the speed reducer from the other end of the housing. The gearing arrangement includes a driven internal gear operatively connected to rotate the output shaft, a driving spur gear which engages the driven internal gear, means on the input shaft for eccentrically orbiting the internal gear, and means for maintaining the driving spur gear nonrotating with respect to the housing. A multiple gearing arrangement may be used to provide a greater speed reduction. In the multiple gearing arrangement, means for maintaining one of the gearing elements nonrotating with respect to the housing are mounted on both ends of the housing.

1 Claim, 11 Drawing Figures

SPEED REDUCER

BACKGROUND OF THE INVENTION

1. Field of the Invention

This invention generally relates to gearing arrangements, speed changing devices, torque converters and like motion transmitting devices, and particularly to those having planetary or epicyclic gearing arrangements including an eccentrically mounted pinion.

2. Description of the Prior Art

Speed reducers comprising an eccentrically mounted spur gear which engages a larger internal gear are well-known. A goal in the design of such speed reducers has been to produce an efficient and quiet mechanism capable of large reductions in speed. Among the problems which often occurs in the operation of such speed reducers is the development of excessive wear on components, particularly between pins which are used to couple certain elements and slots which constrain the pins. This excessive wear can produce vibrations and noise, and can seriously impair the efficiency of the mechanism. Another problem in the design of such speed reducers has been to produce a multiple gear mechanism using such pins and slots which can be made inexpensively.

SUMMARY OF THE INVENTION

The present invention comprises an improved speed reducer capable of providing large reductions in speed in a highly efficient manner. The speed reducer of the present invention requires a very small amount of physical space to obtain the desired output. In addition, it employs a single set of gears with virtually no parasitic friction losses under load, allowing for an extremely efficient device compared to prior devices.

The present invention provides a speed reducer which is quiet in operation and which is substantially free from vibration. The speed reducer is capable of easily handling large loads and torques, and substantially uniform torque and speed relationships may be obtained. Using the design of the present invention, it is also possible to achieve a wide range of speed reductions from the same basic unit by merely changing one gear and the eccentric bushing.

The speed reducer of this invention uses a highly effective means for maintaining one of the gearing elements non-rotating with respect to the housing. This means employs two pairs of pins, each pair extending from opposite directions into an eccentric separator plate having two pairs of perpendicular elongated slots for receiving the pins. The heads of each of the pins which extends through one of the elongated slots is square in cross section, so that the lateral force on the pins is spread evenly along a relatively large surface, as opposed to the point or line contact resulting from round cross-sectional heads of pins used in slots of the prior art which concentrated the lateral force on the pins in a single area. As a result the wear between the pins and the elongated slots is greatly reduced. The reduction of wear between the pins and slots is particularly important, since excessive wear over a long duration of time tends to enlarge the width of the slot or decrease the width of the pin, causing slack between the pin and the slot. This wear can decrease the efficiency of the speed reducer and increase the noise and vibrations produced by the speed reducer.

In accordance with another aspect of the invention, a multiple gearing mechanism is employed to achieve high ratios of speed reduction, wherein the means for maintaining the gearing elements nonrotating with respect to the housing are mounted on each end of the housing enclosing the gearing mechanism. Thus a multiple gearing mechanism resulting in very high torque and very low speed reductions can be made as easily and inexpensively as the simple unitary mechanism.

The speed reducer of the present invention comprises a housing adapted to be mounted on the end of a source of input power such as a motor or other prime mover, with the drive shaft of the motor extending into one end of the housing. A rotatable output shaft, which is coaxial with the input shaft, extends from the other end of the housing. A driven internal gear is operatively connected to rotate with the output shaft. A driving spur gear engages the driven internal gear and is eccentrically orbited by means on the input shaft, which means preferably comprises an eccentric bushing on the shaft. Means are also provided for maintaining the driving spur gear nonrotating with respect to the housing, which means preferably comprises an eccentric separator plate located between the housing and the driving spur gear with pairs of separator pins located on and extending from the housing and the driving spur gear, the pins moving within corresponding pairs of elongated slots in the eccentric separator plate.

DETAILED DESCRIPTION OF THE PREFERRED EMBODIMENTS

Figure 1:
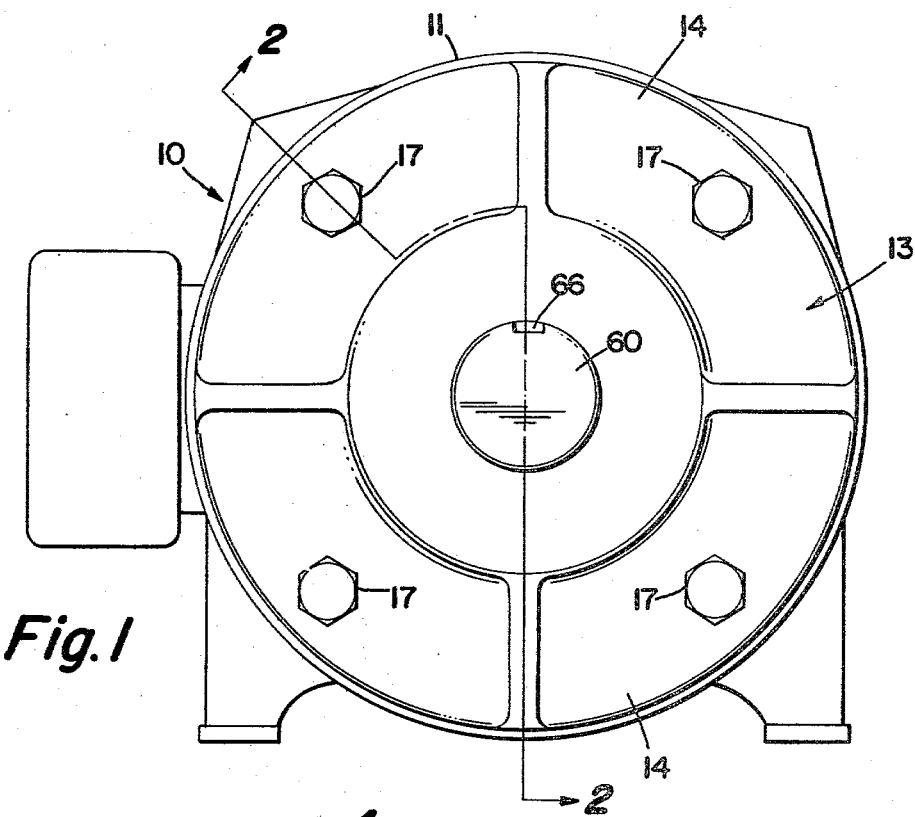
FIG. 1 is an end elevational view of a preferred form of the speed reducer assembly of the present invention.
Figure 2:
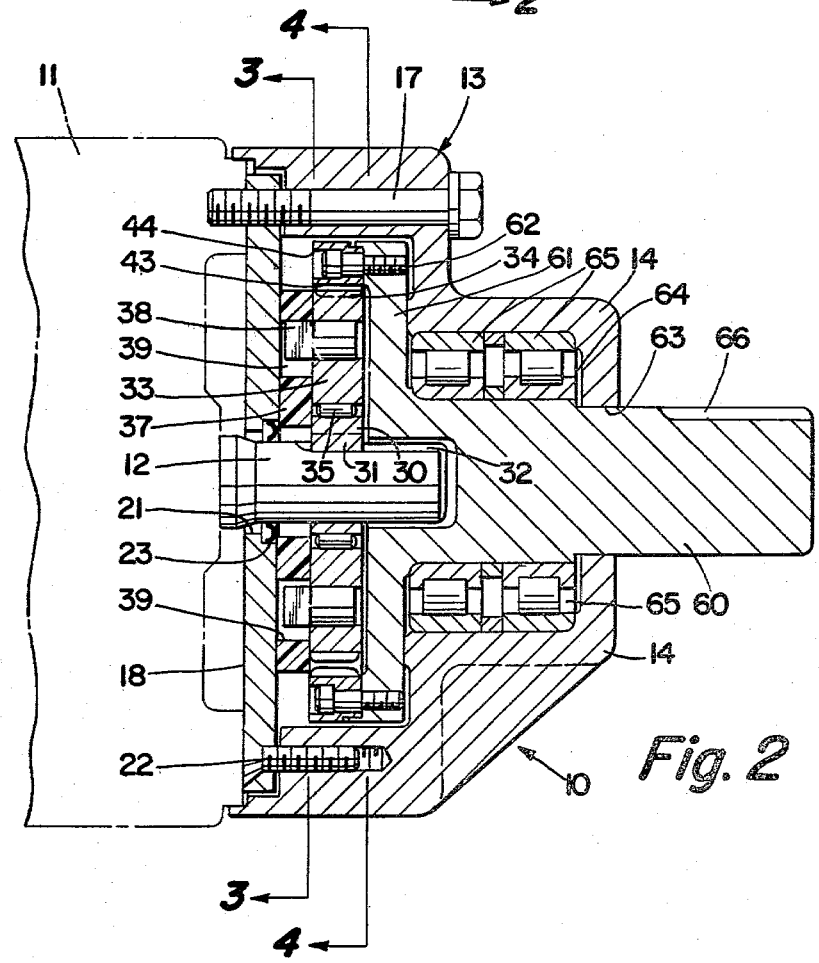
FIG. 2 is a side sectional view of the speed reducer assembly taken along the line 2—2 of FIG. 1.

Referring initially to FIGS. 1-4, there is shown a preferred form of the speed reducer assembly 10 of the present invention. The speed reducer assembly 10 is adapted to be mounted on the end of a prime mover such as an electric or hydraulic motor 11 having a projecting drive shaft 12 (FIG. 2). The speed reducer assembly 10 is contained in a housing assembly 13 comprising a front housing member 14 secured to the end of the motor 11 by suitable fasteners such as bolts 17, and a radially extending back cover plate 18 having a central opening 21 for the projecting motor drive shaft 12 and attached to the front housing member 14 by fasteners such as screws 22. Shaft seals 23 are located around the opening 21 to retain lubrication in the housing assembly 13.

Figure 4:
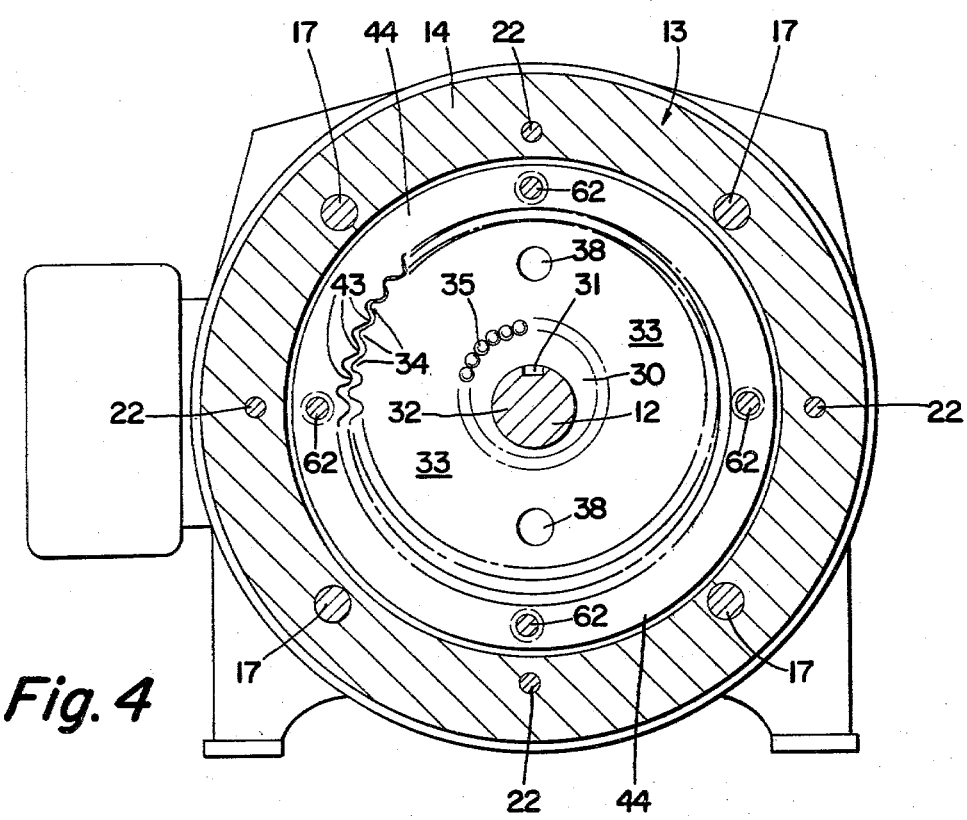
FIG. 4 is an end sectional view taken along line 4—4 of FIG. 2.
Figure 5:
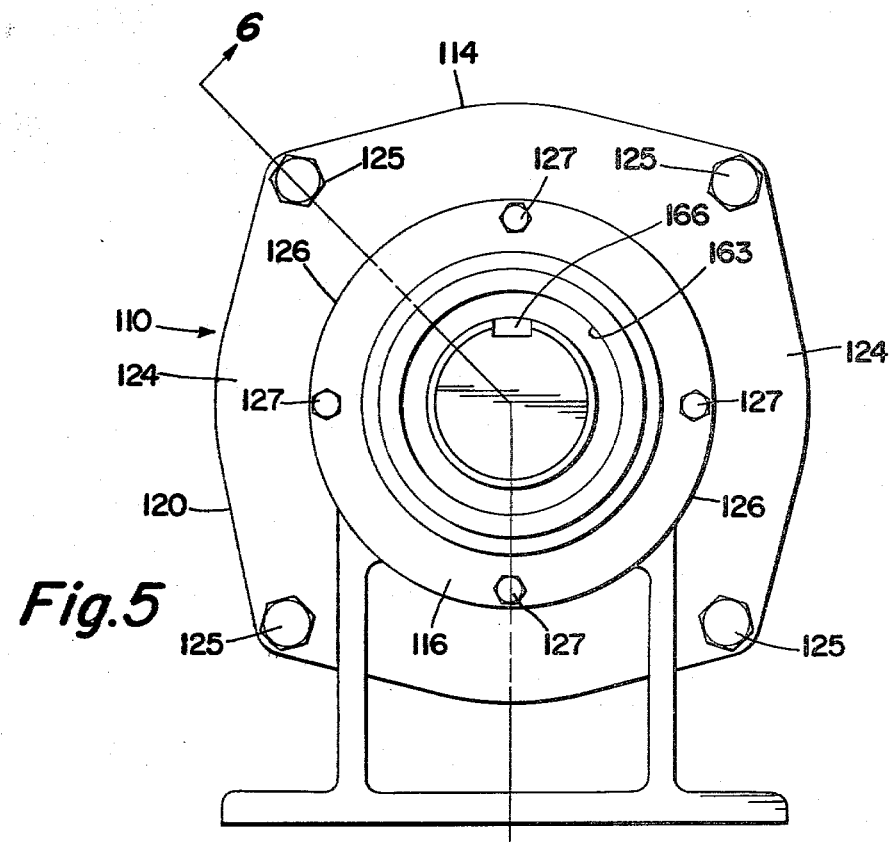
FIG. 5 is an end elevational view of another form of the speed reducer assembly of the present invention.

An eccentric bushing 30 is mounted on the motor drive shaft 12 (FIGS. 2, 4). A keyed hole, having a projection 31, is bored in the eccentric bushing 30 offset to the outside diameter of the bushing. This offset is referred to as the eccentric. The shaft 12 has a longitudinal groove 32 so that the motor drive shaft 12 may be inserted into the keyed hole of the eccentric bushing with the projection 31 fitting within the groove 32, causing the bushing 30 to rotate with the shaft 12. The eccentric bushing 30 is located within the center of a driving spur gear or pinion 33 having teeth 34, the gear being separated from the bushing by means of antifriction bearings 35.

Figure 3:
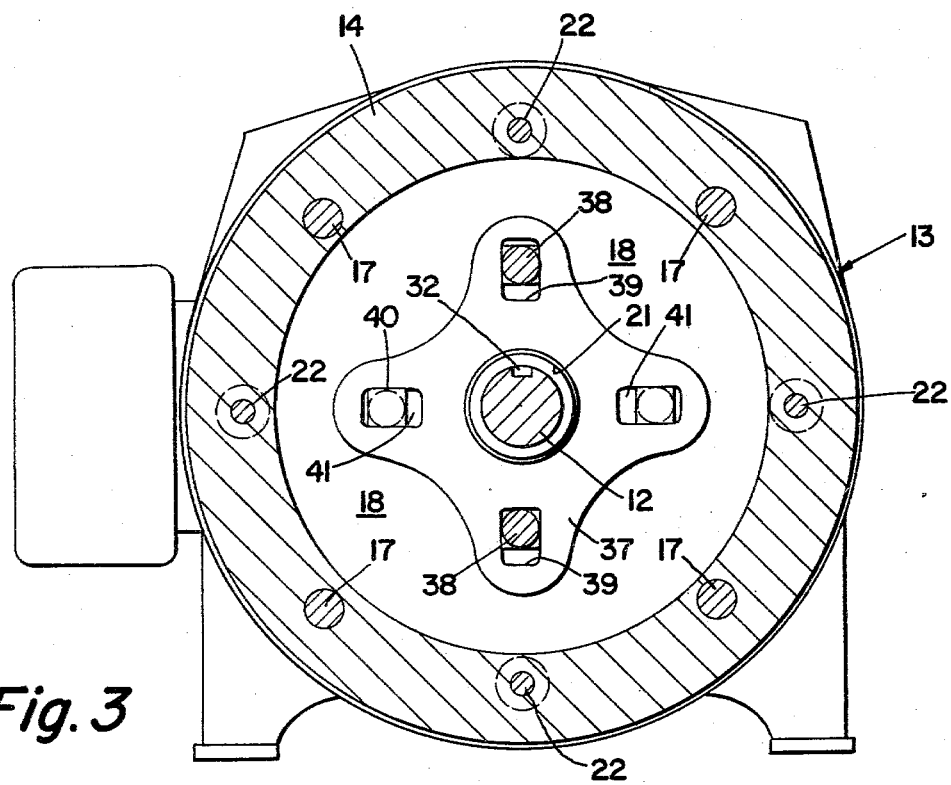
FIG. 3 is an end sectional view of the speed reducer assembly taken along line 3—3 of FIG. 2.

The driving spur gear 33 moves in an orbiting, nonrotating manner with the orbiting movement produced by the rotation of the eccentric bushing 30 with the shaft 12. The gear 33 is maintained nonrotating by means of connection to the back cover plate 18 through a radially extending eccentric separator plate 37 located between and generally parallel to the driving spur gear 33 and the back cover plate 18 (FIGS. 2, 3). A pair of separator pins 38 are mounted in the spur gear 33 equally spaced from the geometric center of the gear and located on opposite ends of a line through the geometric center, so that the pins are located 180° apart from each other. The pins 38 extend from the gear 33 into a corresponding pair of diametrically opposed elongated slots 39 in the eccentric separator plate 37, the slots being equally spaced from the center of the separator plate 37 and located 180° apart from each other. The portions of the pins 39 by which the pins are attached to the gear 33 are round in cross section, and the portions of the pins which fit within the slots 39 are square in cross section. The slots 39 in the plate 37 confine the pins 38 and allow motion of the gear 33 only along one axis.

A second pair of diametrically opposed separator pins 40 (FIG. 3) are mounted in the back cover plate 18. The pins 40 are equally spaced from the longitudinal axis of the motor drive shaft 12 and are located 180° apart from each other and 90° apart from the pins 38. The pins 40 extend from the back cover plate 18 into corresponding diametrically opposed elongated slots 41 in the eccentric separator plate 37, the slots 41 being equally spaced from the center of the separator plate 37 and located 90° from the slots 39. The pins 40 are also round in cross section where the pins are attached to the back cover plate 18, and are square in cross section where the pins 40 fit within the elongated slots 41. The combination of the pins 38 extending from the driving spur gear 33 and pins 40 extending from the back cover plate 18 moving within the corresponding perpendicular pairs of elongated slots 39 and 41 in the eccentric separator plate 37 maintain the gear 33 nonrotating with respect to the back cover plate 18 of the housing assembly 13, while the rotation of the eccentric bushing 30 moves the spur gear 33 in an orbital manner, the nonrotating gear 33 being separated from the rotating bushing 30 by the bearings 35.

The square cross-sectional portion of the pins 38 and 40 provide a relatively long contact surface between the pins and the side of the elongated slots 39 and 41 which reduces the surface pressure between the pins and the slots. In preventing rotation of the spur gear 33, lateral forces are produced which results in surface pressure between the pins 38 and 40 and the sides of the slots 39 and 41. If the portions of the pins which engage the slots were round, these lateral forces would be concentrated at the tangential point or line of contact between the round pin and the side of the slot. As the surface pressure at this contact point approaches the yield point of the material, excessive wear is produced, which results in increased noise and vibration. The square pins, however, spread this lateral force along the entire side edge of the pin as much as possible, thus decreasing the surface pressure at any point between the pin and the slot. This decrease in pressure reduces the wear losses from the movement of the pins in the elongated slots. As a result, vibration and noise are reduced, and efficiency is increased.

Preferably, the slots 39 and 41 and the pins 38 and 40 within the slots are made as narrow as possible to minimize the friction losses of the assembly. These friction losses are due to torque losses produced by friction force between the pin and slot. By decreasing the width of the pins and slots, the torque arm through which the friction force acts is reduced.

As the driving spur gear 33 moves in its orbital path its teeth 34 engage corresponding teeth 43 on a driven internal gear 44 (FIG. 4). The driven internal gear 44 has a greater number of teeth than the driving spur gear 33 and meshes with the spur gear at the pitch line. The dimension of the eccentric or offset of the driving spur gear 33 is tional to the difference in the number of teeth between the spur gear and the internal gear in accordance with known gearing design principles. As the driving spur gear 33 orbits and meshes with the driven internal gear 44, the internal gear 44 rotates at a speed greatly reduced from that of the shaft 12 and the attached eccentric bushing 30, but with a far greater torque.

The gear 44 is located concentric with an output shaft 60 and is attached to a radially extending end plate portion 61 of the shaft by means of suitable fasteners such as bolts 62. The output shaft 60 is coaxial with the input shaft 12 and extends longitudinally from an opening 63 in the end of the front housing member 14. Shaft seals 64 are located in the housing around the opening 63 to retain lubrication in the housing. The output shaft 60 is supported within the housing member 14 by two output reaction bearings 65 which form the reaction supports for any side loads applied to the output shaft 60 and which serve to align the output shaft. The output shaft 60 may be provided with a longitudinally extending key groove 66. As the driven internal gear 44 is rotated at its reduced speed, the attached plate portion 61 and output shaft 60 also rotates. In this manner, the output shaft 60 provides a low speed, high torque output from the motor drive shaft 12.

In the operation of the speed reducer assembly 10, the motor 11 rotates the drive shaft 12 and the attached eccentric bushing 30 at a given speed. As the eccentric bushing 30 rotates the driving spur gear 33 follows the high point of the eccentric bushing 30, engaging the driven internal gear 44 at the pitch line in an orbiting, nonrotating path. The separator pins 38 and 40 move within the corresponding elongated slots 39 and 41 in the eccentric separator plate 37 to restrain the driving spur gear 33 from rotating while allowing it to orbit. The engagement of the orbiting nonrotating driving spur gear 33 causes the driven internal gear 44 and the attached output shaft 60 to rotate at a speed less than that of the motor drive shaft 12. The speed of the motor drive shaft 12 is reduced by an amount equal to the difference in the number of teeth between the driving spur gear 33 and the driven internal gear 44 divided by the number of teeth in the internal gear.

The speed reducer assembly 10 may be modified to be mounted in the opposite direction with the output shaft 60 corresponding to the motor drive shaft and the input shaft 12 corresponding to the output driven shaft so that the same assembly may be used to increase the rotational speed of a prime moving device.

The same basic assembly may also be modified or adapted to be used as a shaft synchronizer or a shaft alignment device.

In order to achieve very high speed reduction, it is possible to employ the design of a multiple speed reducer assembly shown in FIGS. 5–11. The speed reducer assembly 110 is adapted to be attached to a prime mover such as a motor 111 (FIG. 6) having a motor drive shaft 112 projecting from one end.

The speed reducer assembly 110 is contained in a housing assembly 113 comprising a back housing member 114, a front housing member 115, and a front cover plate 116. The back housing member 114 is mounted on the end of the motor 111 and includes a radially extending back cover plate 118, a smaller diameter cylindrical portion 119, and a larger diameter cylindrical portion 120. The back cover plate 118 which covers the end of the motor 111 has a central opening 121 for the motor drive shaft 112 with shaft seals 123 located around the opening. The front housing member 115 includes a radially extending portion 124 which is attached to the larger diameter cylindrical portion 120 of the back housing member 114 by suitable fasteners such as bolts 125, and an axially extending cylindrical portion 126. The front cover plate 116 is attached to the end of the axially extending portion 126 by fasteners such as bolts 127.

Figure 6:
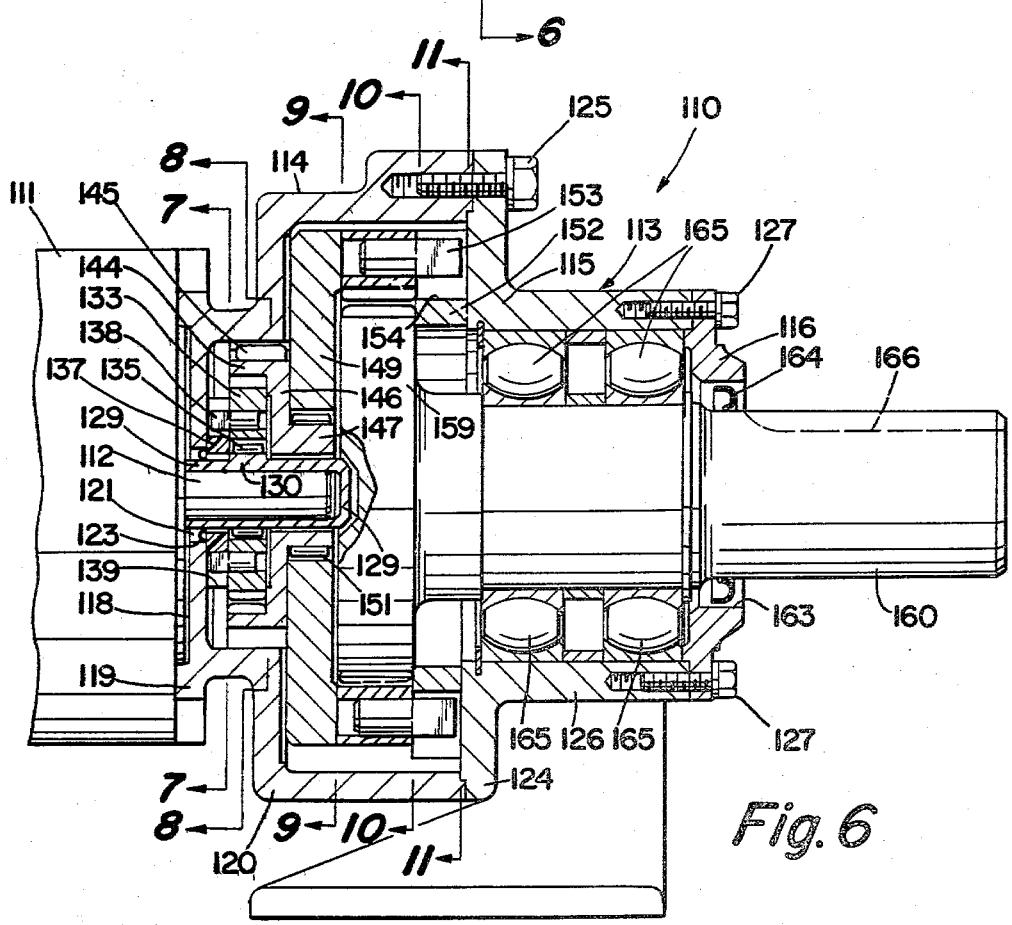
FIG. 6 is a side elevational view of the second form of the speed reducer assembly taken along line 6—6 of FIG. 5.
Figure 8:
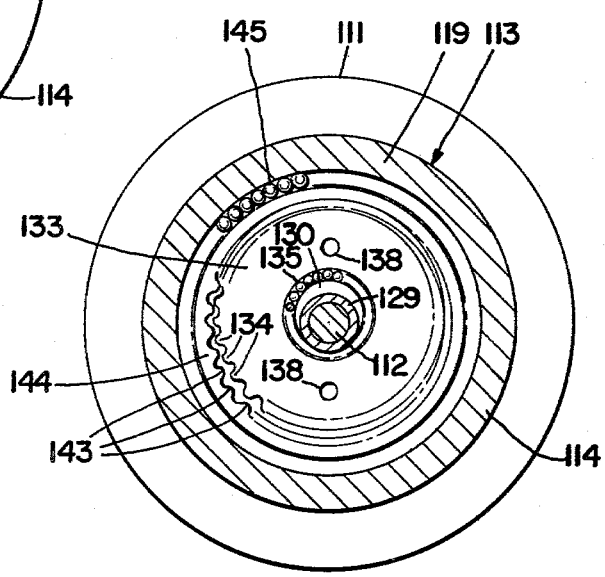
FIG. 8 is an end sectional view taken along line 8—8 of FIG. 6.
Figure 9:
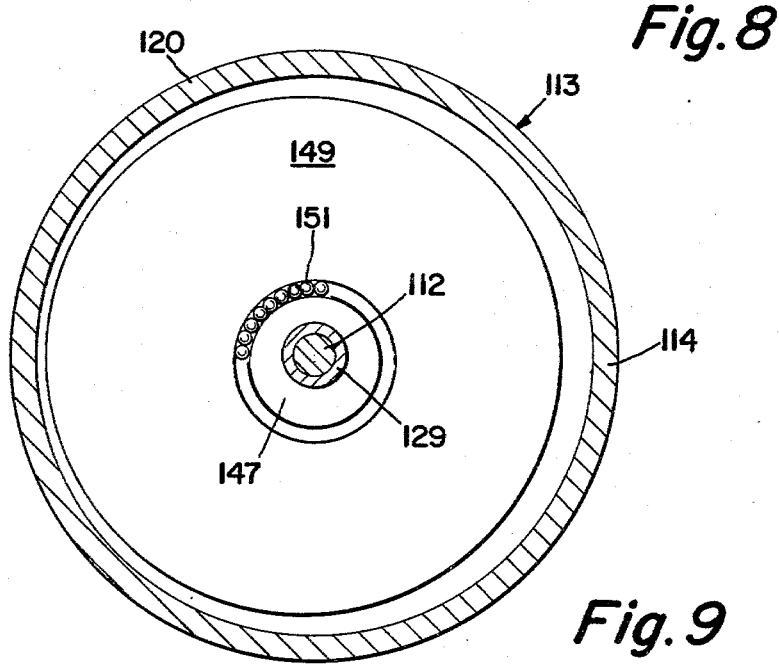
FIG. 9 is another end sectional view taken along line 9—9 of FIG. 6.

A shaft sleeve 129, having an integral portion forming an eccentric bushing 130, fits over the motor drive shaft 112 and rotates therewith (FIGS. 6, 8). A driving spur gear of pinion 133 having teeth 134 is centrally mounted on the eccentric bushing 130 and separated therefrom by antifriction bearings 135. As with the previous form of speed reducer assembly, the driving spur gear 122 is moved in an orbiting path by the rotation of the eccentric bushing 130.

Figure 7:
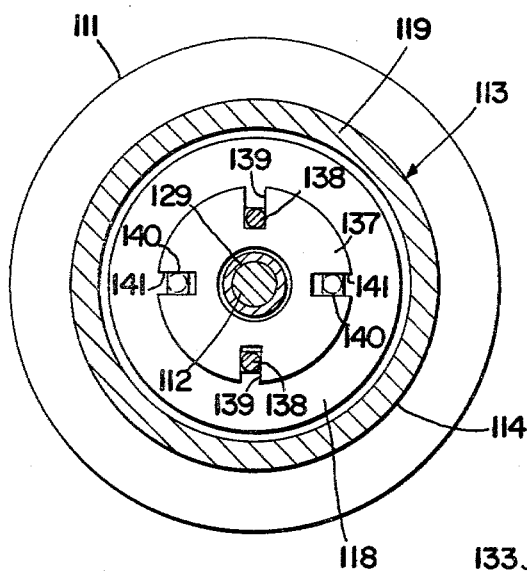
FIG. 7 is an end sectional view of the second form of speed reducer assembly taken along line 7—7 of FIG. 6.

To maintain the driving spur gear 133 nonrotating with respect to the housing assembly 113, an eccentric separator plate 137 is provided between the gear 133 and the back cover plate 118 (FIGS. 6, 7). As with the previously described eccentric separator plate 37, a pair of diametrically opposed separator pins 138 are mounted in and extend from the gear 133 and move within corresponding elongated slots 139 in the plate 137. A second pair of diametrically opposed separator pins 140 extend from the back cover plate 118 and move within corresponding elongated slots 141 in the separator plate 137. The pins 138 and the pins 140 are located 90° apart from each other. The movement of the pins 138 and 140 is restrained by the corresponding perpendicular pairs of elongated slots 139 and 141, providing means by which the gear 133 is maintained in a nonrotating manner with respect to the back cover plate 118 while it is permitted to move in an orbiting path.

As the driving spur gear 133 moves in an orbiting path, its teeth 134 engage corresponding teeth 143 in a driven internal gear 144 (FIGS. 6, 8). The internal gear 144 is thus caused to rotate at a speed greatly reduced from the speed of rotation of the motor drive shaft 112. As the internal gear 144 rotates, it is supported and maintained in position concentric to the motor shaft 112 by the cylindrical portion 119 of the back housing member 114 and is allowed to rotate within the housing member 114 by antifriction bearings 145 between the outer periphery of the gear and the interior of the housing. The driven internal gear 144 includes a radially extending plate portion 146 (FIG. 6) and an axially extending portion forming a second eccentric bushing 147 (FIGS. 6, 9) which rotates with the gear. The eccentric bushing 147 has an outer diameter which is offset from the axis of the motor drive shaft 112.

Figure 11:
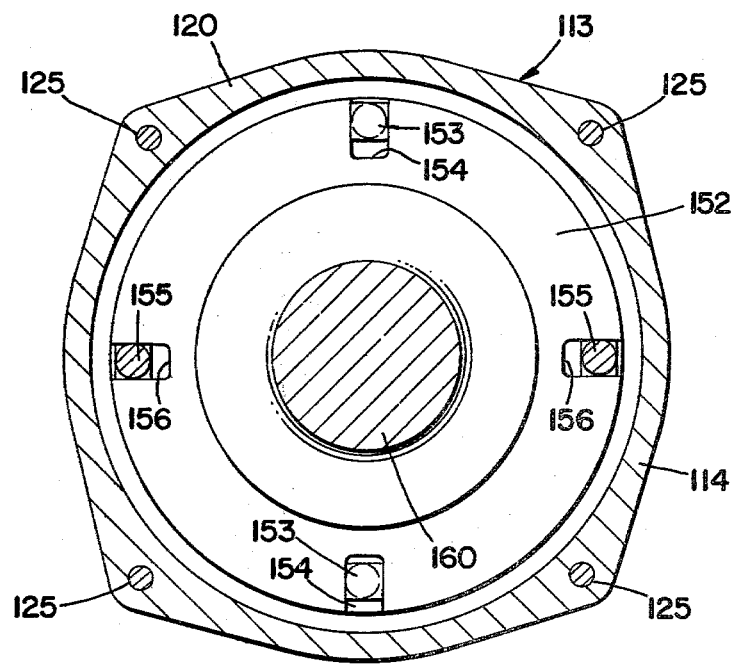
FIG. 11 is another end sectional view taken along line 11—11 of FIG. 6.

A second internal gear 149 having teeth 150 is centrally mounted on the bushing 147 and separated therefrom by antifriction bearings 151. The driving internal gear 149 moves in an orbiting nonrotating path in accordance with the eccentricity of the rotating second eccentric bushing 147. While the driving internal gear 149 orbits, it is maintained nonrotating with respect to the housing assembly 113 by means of a second eccentric separator plate 152 (FIGS. 6, 11). A pair of separator pins 153 located 180° apart from each other are secured in and extend from the driving internal gear 149. The pins 153 move within corresponding diametrically opposed elongated slots 154 in the eccentric separator plate 152. Another pair of separator pins 155, located 180° apart from each other and generally 90° apart from the separator pins 153, are secured in and extend from the radially extending portion 124 of the front housing member 115. The separator pins 155 are constrained to move within corresponding elongated slots 156 in the eccentric separator plate 152. As with the previously described separator pins 38 and 40, and 138 and 140, the separator pins 153 and 155 have cylindrical portions by which the pins are attached to the driving internal gear 149 or to the front housing member 115 and have generally square cross-sectional portions which extend within the elongated slots 154 and 156 to increase the surface along which the pins engage the slots and to thereby decrease the contact pressure.

Figure 10:
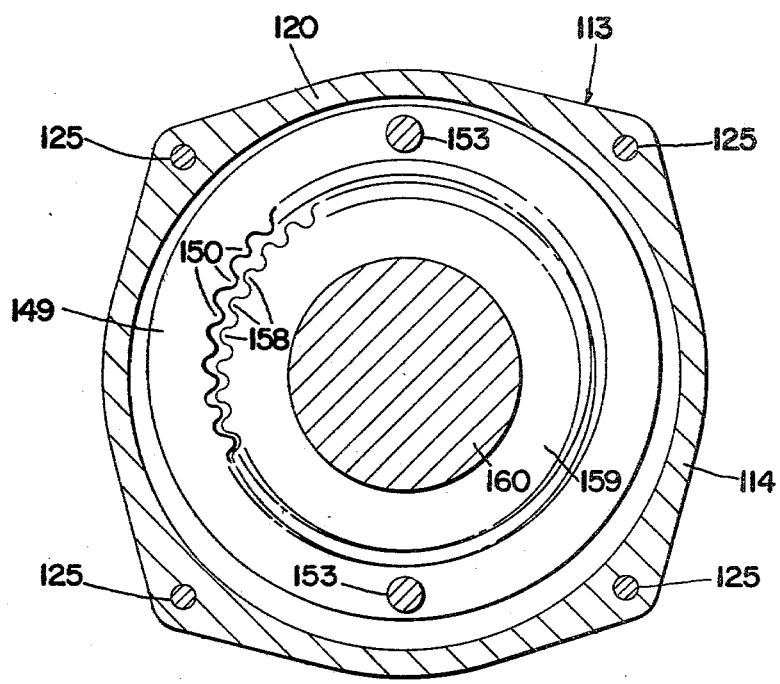
FIG. 10 is another end sectional view taken along line 10—10 of FIG. 6.

The teeth 150 of the orbiting, nonrotating internal gear 149 engage teeth 158 of a rotatable second spur gear or pinion 159 (FIGS. 6, 10). The driving internal gear 149 thus causes the driven spur gear 159 to rotate at a speed greatly reduced from the rotational speed of the driven internal gear 144. The driven spur gear 159 is integrally attached to the end of an output shaft 160 (FIG. 6). The shaft 160 extends coaxially with the motor drive shaft 112 through the axially extending cylindrical portion 126 of the front housing member 115 and projects from an opening 163 in the front cover plate 116. Shaft seals 164 are located around the opening 163. A pair of antifriction bearings 165 may be provided between the shaft 160 and the portion 126 of the front housing member 115 to support and align the shaft. The projecting end of the output shaft 160 may be provided with a keyed groove 166.

With this design of a multiple gearing speed reducer, two sets of spur gear and internal gear mechanisms are used, and pairs of separator pins 140 and 155 extend from both ends of the housing, so that both ends of the housing are used for the mounting of separator plates to maintain one of the gearing elements of each set nonrotating with respect to the housing.

In the operation of the multiple speed reducer assembly 110, the motor 111 drives the rotation of the shaft 112 and the attached sleeve 129 having the eccentric bushing 130. As the bushing 130 rotates, it moves the driving spur gear 133 in an orbiting path. The driving spur gear 133 is constrained from rotating by the restriction of the pins 138 and 140 in the elongated slots 139 and 141 of the eccentric separator plate 137. The spur gear 133 thus drives the internal gear 144 and causes the driven internal gear and the integrally attached eccentric bushing 147 to rotate. The rotation of the second eccentric bushing 147 moves the second internal gear 149 in an orbiting path. The driving internal gear 149 is prevented from rotating by engagement of the separator pins 153 and 155 in the slots 154 and 156 of the second eccentric separator plate 152. As the driving internal gear 149 moves in an orbiting nonrotating path, it engages the centrally mounted second spur gear 159 and causes the driven spur gear to rotate at a speed less than that of the driven internal gear 144 and greatly reduced from that of the motor drive shaft 112.

While the invention has been shown and described with respect to specific embodiments thereof, these are intended for the purpose of illustration rather than limitation, and other modifications and variations will be apparent to those skilled in the art all within the intended spirit and scope of the invention.

What is claimed is:

1. A speed reducer which comprises:

a housing including a back portion having a first pair of projecting separator pins each of which is generally square in cross section and including a front portion having a second pair of projecting separator pins each of which is generally square in cross section;

a rotatable input shaft extending through the back portion of the housing;

a first eccentric bushing fixedly mounted on the input shaft to rotate therewith;

a driving spur gear mounted on the first bushing and having a third pair of separator pins each of which is generally square in cross section projecting therefrom toward the back portion of the housing;

a first eccentric separator plate located between the back housing portion and the driving spur gear, the first separator plate having two opposed pairs of slots, one of the pairs of slots adapted to receive the first pair of separator pins from the back housing portion and the other pair of slots adapted to receive the third pair of separator pins from the driving spur gear, both pairs of pins being movable within the slots to maintain the driving spur gear nonrotating with respect to the housing;

a driven internal gear which engages the nonrotating driving spur gear and which is rotated thereby;

a second eccentric bushing fixedly mounted on the driven internal gear to rotate therewith;

a driving internal gear mounted on the second bushing and having a fourth pair of separator pins each of which is generally square in cross section projecting therefrom toward the front portion of the housing;

a second eccentric separator plate located between the front portion of the housing and the driving internal gear, the second separator plate having two opposed pairs of slots, one of the pairs of slots adapted to receive the second pair of separator pins from the front housing portion and the other pair of slots adapted to receive the fourth pair of separator pins from the driving internal gear, both pairs of pins being movable within the slots to maintain the driving internal gear nonrotating with respect to the housing;

a driven spur gear which engages the orbiting nonrotating driving internal gear and is rotated thereby; and a rotatable output shaft extending from the front portion of the housing and coaxial with the input shaft, the driven spur gear being fixedly mounted on the output shaft to rotate the output shaft therewith.

* * * * *